May 5, 1970  C. C. WADDLE ET AL  3,510,114

DISCHARGE GRATE MECHANISM FOR SHAFT KILN

Filed May 31, 1968

INVENTORS
Craig C. Waddle
John C. Scott
Robert H. Harris
By Ralph F. Crandell
ATTORNEY INVENTORS
Craig C. Waddle
John C. Scott
Robert K. Harris
By Ralph F. Crandell
ATTORNEY

United States Patent Office

3,510,114
Patented May 5, 1970

3,510,114
DISCHARGE GRATE MECHANISM FOR SHAFT KILN
Craig C. Waddle, Evergreen, John C. Scott, Denver, and Robert K. Harris, Littleton, Colo., assignors to Mintech Corporation, a corporation of Colorado
Filed May 31, 1968, Ser. No. 733,435
Int. Cl. F27b 1/00
U.S. Cl. 263—29
4 Claims

ABSTRACT OF THE DISCLOSURE

A discharge grate mechanism is disclosed for use in discharging solid particulate materials at a uniform rate from a gravity flow moving bed processing unit, such as a vertical shaft kiln. The discharge grate includes concentric support plates defining annular openings, and annular retarder plates below each opening. Pusher bars are used to push solids from the retarder plates. The discharge grate mechanism is sealed so that the unit can be operated at temperatures above ambient temperatures and at pressures greater than atmospheric.

BACKGROUND OF THE INVENTION

The field of the invention is that of vertical shaft kilns. More particularly the invention relates to a discharge grate mechanism for a vertical shaft kiln.

The prior art is evidenced in U.S. Pat. No. 3,027,147, issued Mar. 27, 1962, to Lewis H. Brakel and John B. Jones, Jr., for "Circular Shaft Kiln Discharge Grate." This patent discloses a discharge grate for a shaft kiln embodying circular pusher members adapted for orbital movement between concentric deflector members and subjacent retarder plates. The unit is adaptable for lower pressure, low temperature uses.

OBJECTS OF THE INVENTION

One object of the present invention is to improve existing grate discharge mechanisms for vertical shaft kilns.

Another object of the present invention is to facilitate operation of vertical shaft kilns at temperatures greater than ambient temperatures and at pressures greater than atmospheric.

A further object of the present invention is to improve the operation of vertical shaft kilns by increasing the controllability of the grate mechanism and providing for selective independent operation of individual segments of the mechanism.

Still a further object of the invention is to facilitate the introduction of a coolant into the mechanism where high temperature operations are encountered.

SUMMARY OF THE INVENTION

Figure 1:
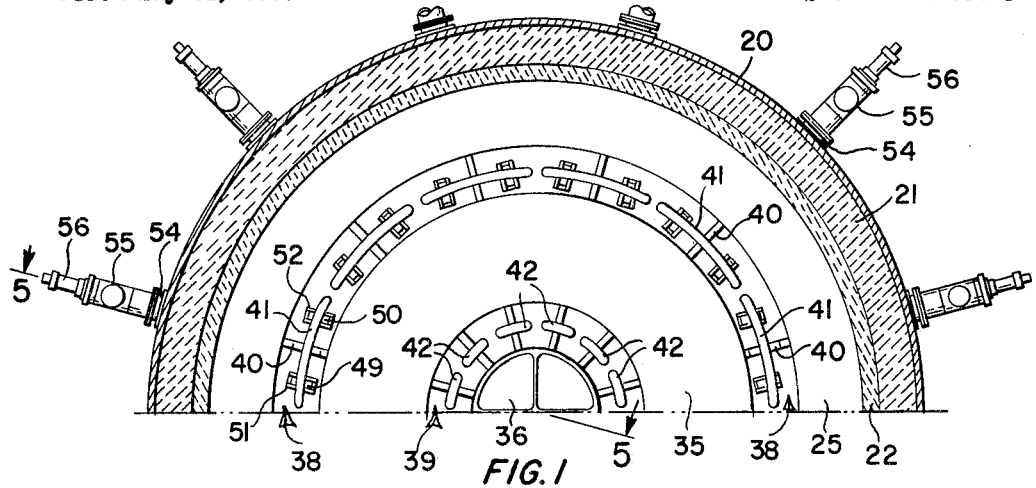
FIG. 1 is a half transverse section through a transversely circular shaft kiln showing in top plan one illustrative mechanism embodying the present invention.
Figure 3:
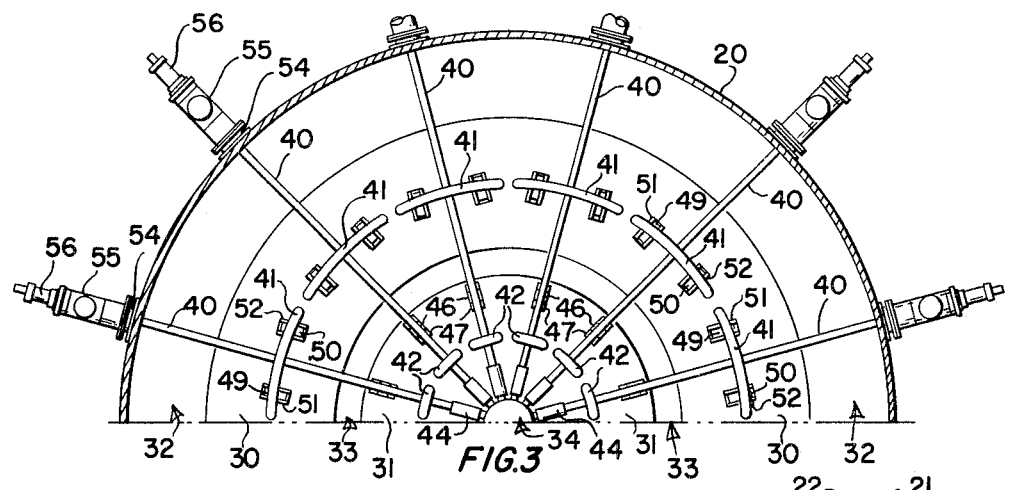
FIG. 3 is a half transverse section view taken substantially on the plane of line 3—3 on FIG. 2.
Figure 2:
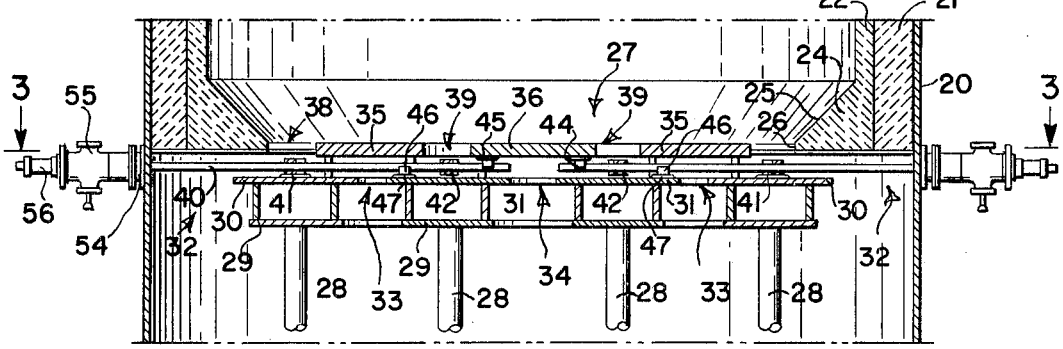
FIG. 2 is a section axially through the arrangement shown in FIG. 1 with certain nonessential parts omitted for purposes of clarity.
Figure 4:
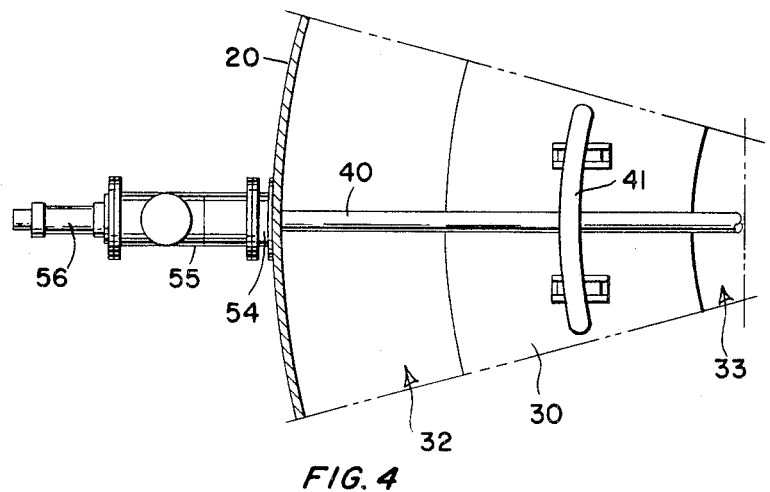
FIG. 4 is a fragmentary detail plan view, on a relatively enlarged scale, of a segment of the organization shown in FIG. 3.
Figure 5:
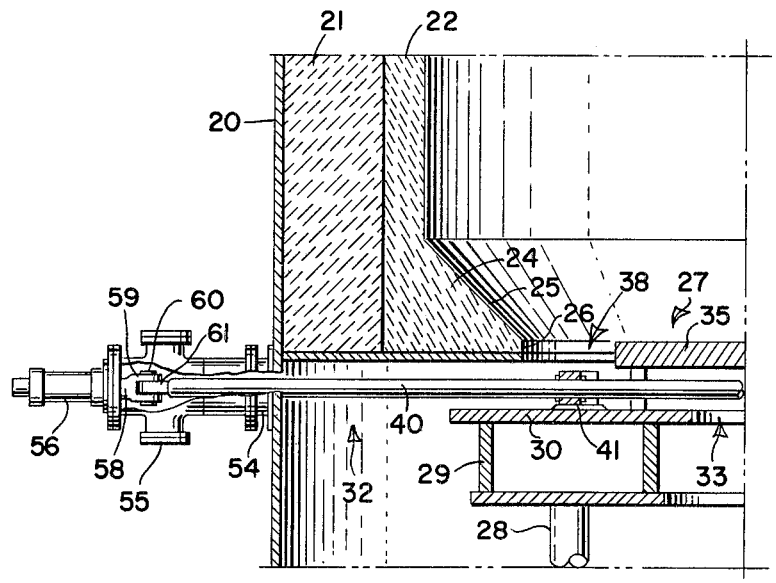
FIG. 5 is a fragmentary detail section, on a relatively enlarged scale, taken substantially in the plane of line 5—5 on FIG. 1.

The invention resides in improvements in a discharge grate mechanism for a vertical shaft kiln having an outer shell and an inner liner terminating at its lower end in an inwardly flaring skirt. A plurality of coplanar support plates are positioned in the kiln to form, with the inner liner, a plurality of coplanar concentric annular openings. Positioned below each annular opening is a retarder plate defining, with the outer shell and each other, a plurality of discharge throats. To discharge material retained on the retarder plates, there is provided a segmental grate discharge mechanism comprising a plurality of radially extending pusher rods, each of which carries a pusher bar overlying each retarder plate. The pusher rods are sealed for reciprocating straight-line movement through the shell, and are driven by an appropriate power unit, such as a hydraulic piston and cylinder motor mounted exteriorly of the shell. Reciprocation of the pusher rods causes the pusher bars to discharge material from the retarder plates through the adjacent discharge throats. The rods are guided and slidably supported on the retarder plates, and they may be hollow to accommodate the flow of a coolant fluid where the operation is to be carried out at high temperatures. The sliding seal supporting each member through the kiln wall facilitates operations at greater than atmospheric pressure.

DESCRIPTION OF THE PREFERRED EMBODIMENT

Kilns and furnaces adapted to accommodate a continuous, gravity induced flow of discrete or particulate solids in exposure to fluids, either gas or liquid, for purposes of carrying out a reaction between the solids and the fluids, have long been known and utilized for the processing and treatment of many specific substances. Appropriately styled "shaft kilns," such structures are extensively employed in many industrial applications. In some of the applications, thermal reactions are promoted by means of hot gases contacting the solids. In such processes, the efficacy of the reaction is in large measure, determined by the uniformity of solids movement through all zones of the kiln and the uniformity of gas flow permeating the solids. As a significant factor, means are provided for controlling the discharge of solids from the kiln to effect a uniform flow rate for all solids moving through the units. Hence, the instant invention is directed to the provision of an improved grate structure for effecting discharge of the solids while allowing hot gaseous or liquid fluids to pass in counter-current relation with the solids in the kiln, while maintaining high temperature and high pressure reaction conditions wthin the apparatus.

The grate structure shown in the drawings exemplifies the present invention and finds particular, but not necessarily exclusive use of association with transversely circular shaft kilns of moderates to large diameters. An illustrative kiln comprises an axially-vertical tubular shell 20 of appropriate rigid material and of any expedient construction. The kiln shell 20 is generally provided with an intermediate refractory liner 21 and an inner liner 22 formed of an appropriate nonreactive refractory material. At its lower end the inner liner 22 is formed with an inwardly flaring or sloping skirt 24, defining an upwardly directed frusto-conical surface 25 sloping inwardly and downwardly to define a central opening 26. In order to control the flow of solids material through the kiln and the opening 26, a discharge grate mechanism 27 embodying the present invention is mounted in the lower end of the shell 20. The lower end of the kiln may be closed with provision being made for withdrawing solids material therefrom after treatment in the kiln.

For purposes of supporting the grate structure herein described, an internal supporting structure, having a plurality of supporting posts or members 28 is mounted on the bottom (not shown) of the shell and extends upwardly towards the skirt 24. At their upper ends, and in spaced juxtaposition with the skirt 24, the posts 28 support a plurality of annular structural members 29 which in turn support a plurality of coplanar annular retarder plates. In the embodiment shown in the drawings there is provided an outer annular retarder plate 30 and an inner annular retarder plate 31. These plates are coplanar and concentric with the outer circumference of the outer annular retarder plate 30 being spaced beneath and underlying the frusto-conical surface of the skirt 24. The inner and outer annular retarder plates 30, 31, together with the shell 20, define concentric throats, namely an outer annular throat 32, an intermediate annular throat 33 and an inner ciruular throat 34. Cooperating with the retarder plates 30, 31 to obstruct the flow of solids through the kiln are a plurality of concentric coplanar support plates 35, 36 spacedly superimposed respectively above the intermediate and inner throats 33, 34. The skirt 24 on the lower end of the inner liner overlies the outer throat 32. The support plates 35, 36 together with the skirt 24, define coplanar annular openings 38, 39 directly above the corresponding retarder plates 30, 31 respectively. The support plates or deflector 35, 36 may present a flat upper surface, as shown in the drawing, or may be triangular in cross-section so as to present an upwardly directed apex or peak as shown in U.S. Pat. No. 3,027,147.

Solid particles of material to be treated are placed in the vertical kiln. The passage of these particles through the kiln is retarded or obstructed by the coaction of the support plates 35, 36 and the retarder plates 30, 31. The vertical spacing of the retarder plates 30, 31 below the support plates 35, 36 and the skirt 24, the dimensions of the annular openings 38, 39 between the support plates, and the dimensions of the retarder plates 30, 31 are determined by the angle of repose of the particular solid material particles being treated in the kiln. The angle of repose may be defined as the maximum base angle of a triangle formed by a perpendicular cross section through a pile of the solid material just prior to the point at which particles will slip off of the sides of the pile. It will be appreciated that a low angle of repose will necessitate a relatively narrow vertical spacing between the retarder plates and support plates, as well as relatively wide retarder plates as compared to the dimensions of the annular openings between the support plates. A high angle of repose, on the other hand, will permit a greater vertical spacing between the retarder plates and the support plates and will permit the use of relatively narrower retarder plates as compared to the support openings between the plates.

With a properly designed grate mechanism, solid material will not flow naturally through the grate, but will accumulate on and be retarded by the retarder plates. To dislodge and discharge solids material accumulated on the retarder plates 30, 31 through the annular throats 32, 33, 34, the present invention contemplates the provision of a new and improved movable pusher bar or rake structure positioned in the space between the support plates and the retarder plates. In this regard, the pusher bar or rake mechanism disclosed in the drawings comprises a plurality of radially extending rods 40 hydraulically actuated to move radially inwardly and outwardly of the kiln. Fixed on each of the rods adjacent each retarder plate are arcuate pusher bars 41, 42 overlying respectively retarder plates 30, 31. The action of the pusher bars 41, 42 is to push solids material on the retarder plates through the adjacent throats 32, 33, 34, thereby allowing additional material from the kiln to pass through the annular openings 38, 39 onto the subjacent retarder plates 30, 31.

Provision is made for supporting the rods 40 for radial reciprocating movement with respect to the kiln. To this end each rod at its inner end is provided with a bearing block 44 which slidingly bears on a bearing plate 45 secured to the underside of the inner support plate 36. For supporting the rod on the inner annular retarder plate 31 the rod 40 is provided with a bearing block 46, located between the pusher 41 and the pusher 42, which slidingly bears on a bearing plate 47 fixed on the upper surface of the inner annular retarder plate 31. Radially outwardly of the support blocks 44 and 46 the rod 40 is supported by means of bearing blocks 49, 50 secured to the lower edge of the outer pusher 41 and slidingly supported on corresponding bearing plates 51, 52 mounted on the outer annular retarder plate 30. At its outer end, the rod 40 is slidingly and sealingly mounted and supported in the kiln wall by means of an appropriate sleeve type sealing nozzle 54 which is welded or otherwise sealed to the shell 20. Sealed to the nozzle 54 is a connector housing 55 on which is mounted a hydraulic piston and cylinder motor 56. The piston 58 of the motor 56 is secured to the free end of the rod 40 by a clevis 59 integral with the piston 58 and a pin 60 engaged through an apertured ear 61 on the end of the rod 40. The housing is provided with one or more access and drain ports. Where desired the rod 40 may be hollow to provide for transmission of coolants to cool the rod and the pusher bars or to provide for the introduction of fluids into the interior of the kiln. Also thermocouples or other control devices can be contained in or carried by the rods to the kiln interior. The housing 55 provides a convenient access means to the interior of the rod for these purposes.

The hydraulic motors 56 for driving each pusher rod 40 are double acting hydraulic piston and cylinder motors of conventional construction and operation. These units are actuated by supplying hydraulic fluid to one end of the piston (not shown) while exhausting hydraulic fluid from the other end. The supply of hydraulic fluid to each cylinder is controlled through a solenoid actuated direction valve (not shown) and the position of the piston in the cylinder determined by engagement of an extension rod on the piston with a pair of limit switches (not shown) mounted adjacent the cylinder. While the motors 56 may be positioned so that all motor pistons are moving in the same direction at the same time, it is desirable, in order to avoid extreme stresses on the kiln shell, to connect the motors so that alternate rods 40 are driven in opposite directions. The motor and solenoid controls are constructed for essentially two-position operation, that is the pistons are either fully extended or fully retracted. By alternating the inlet and outlet ports of the solenoid valves, the pusher rod motors 56 can be connected so that alternate pusher rods 40 are extended and the remaining ones are retracted. In other respects the hydraulic and electrical circuits are conventional.

The grate mechanism design herein described and particularly the construction of the pusher rods is particularly suited for high temperature and high pressure operations as well as for larger diameter kilns. The design is relatively simple in that individual rods are utilized which move in a straight line radial direction. Maintenance and repair is thus simplified. The load on the hydraulic motors driving the pressure rods is also reduced as the pushing action of each rod is localized in the particular sector of the kiln in which the rod is mounted. Not only are the power requirements for reciprocating each rod substantially reduced, but the stresses on each individual rod are reduced. This is a particularly important factor when high temperature operations are encountered.

With the foregoing grate mechanism construction, and with the hydraulic motors mounted externally of the kiln, the interior of the kiln remains completely sealed for operation at temperatures greater than room temperature and at pressures greater than atmospheric. All controls are external of the kiln, thereby simplifying maintenance.

The improved discharge grate mechanism may be used in various ways to control the flow of solids material through the kiln and at the same time facilitate the introduction of fluids into the kiln for treatment of the solids. Where the fluid is a gas for example, it will pass upwardly through the various openings defined in the grate and thereby come into contact with the solids material. Where the operation is carried out at temperatures greater than ambient temperatures, it may be desirable to cool the pusher rods and bars. To this end, as pointed out above, the rods may be hollow and coolant can then be introduced through the external chamber 55 into the outer end of the pusher rod 40. If the coolant fluid is compatible with the treatment fluid, the internal end of the pusher rods 40 can be open so that the coolant passes upwardly through the kiln. If this is not practical, an internal return pipe must be provided within each pusher rod to provide for the exhaust of the coolant substance.

While a certain illustrative form of the present invention has been shown in the drawings and described above in considerable detail, it should be understood that there is no intention to limit the invention to the specific form disclosed. On the contrary it is the intention to cover all modifications, alternative constructions, equivalents and uses of the present invention.

What is claimed is:

1. In a discharge grate for a vertical shaft kiln having an outer shell and an inner liner terminating at its lower end in an inwardly flaring skirt, said kiln being adapted to confine a charge of discrete solids material for continuous gravity flow therethrough, said grate including a coplanar array of support plates defining with said skirt and each other a plurality of coplanar annular openings, and a plurality of annular retarder plates corresponding in number to and spacedly underlying each of said openings, said retarder plates defining with the outer shell and each other a plurality of coplanar annular throats, the improvement comprising a plurality of elongated members extending through said shell radially of the kiln and intermediate said support plates and said retarder plates, means slidably sealing said members in said kiln shell, means for radially reciprocating said members with respect to said kiln, pusher means secured to each of said members for discharging solids material retained on said retarder plates through said throats, and bearing means on each of said retarder plates and on at least one of said support plates for supporting said elongated members for radial reciprocation with respect to said kiln.

2. The improvement according to claim 1 wherein said means for radially reciprocating said members comprises solenoid controlled hydraulic piston and cylinder motors.

3. The improvement according to claim 1 wherein said elongated members are tubular and means are provided for supplying coolant thereto.

4. In a discharge grate for a vertical shaft kiln having an outer shell and an inner liner terminating at its lower end in an inwardly flaring skirt, said kiln being adapted to confine a charge of discrete solids material for continuous gravity flow therethrough, said grate including a coplanar array of support plates defining with said skirt and each other a plurality of coplanar annular openings, and a plurality of annular retarder plates corresponding in number to and spacedly underlying each of said openings, said retarder plates defining with the outer shell and each other a plurality of coplanar annular throats, the improvement comprising a plurality of tubular elongated members extending through said shell radially of the kiln and intermediate said support plates and said retarder plates, a sealing nozzle mounted on the external wall of the kiln shell adjacent the extending end of each said tubular elongated member for slidably sealing said members in said kiln shell, a connector housing mounted on each said sealing nozzle and enclosing the open outer end of the associated tubular elongated member, a solenoid controlled hydraulically actuated piston and cylinder motor mounted on each said connector housing and operatively connected to the enclosed tubular elongated member for radially reciprocating said member with respect to said kiln, a plurality of generaly arcuate pusher means secured to each of said tubular elongated members and overlying said annular retarder plates for discharging solids material retained on said retarder plates through said throats, bearing means on each of said retarder plates and on at least one of said support plates for supporting said elongated members for radial reciprocation with respect to said kiln, and means for supplying a coolant to said connector housing and thereby through said tubular elongated member for cooling the same and said pusher means secured thereto during operation of the kiln.

References Cited

UNITED STATES PATENTS

| 2,573,492 | 10/1951 | Richardson | 214—18 |
| 3,027,147 | 3/1962 | Brakel et al. | 263—29 |
| 3,360,249 | 12/1967 | Trumbo et al. | 263—29 |
| 3,401,922 | 9/1968 | Jones | 263—29 |

JOHN J. CAMBY, Primary Examiner

U.S. Cl. X.R.

214—18